O. EBERT.
HOLLOW MILL.
APPLICATION FILED NOV. 6, 1916.
1,227,533.
Patented May 22, 1917.
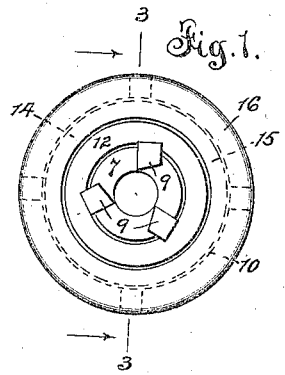
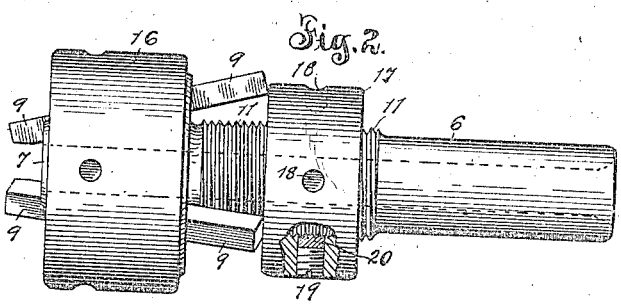
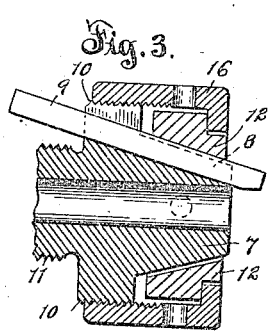
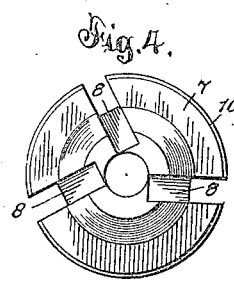
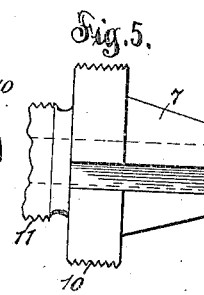
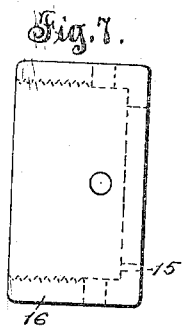
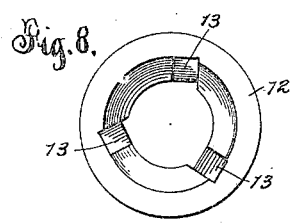
Witness
S.W.Brainard.
Inventor
Otto Ebert.
By John A. Bommhardt.
Attorney

UNITED STATES PATENT OFFICE.

OTTO EBERT, OF CLEVELAND, OHIO.

HOLLOW MILL.

1,227,533.　　　Specification of Letters Patent.　　Patented May 22, 1917.

Application filed November 6, 1916.　Serial No. 129,747.

*To all whom it may concern:*

Be it known that I, OTTO EBERT, a citizen of the United States, residing at Cleveland, in the county of Cuyahoga and State of Ohio, have invented certain new and useful Improvements in Hollow Mills, of which the following is a specification.

This invention relates to hollow mills or milling cutters of the adjustable or expansible type, and in some respects it is an improvement on the mill shown in my U. S. Patent No. 1,165,859.

The object of the present improvement is to provide improved means for simultaneously clamping the cutters at adjustment, thereby saving the time and labor of separate fastenings.

When three cutters are used, the clamping ring will bind on all the cutters equally. The cutters are adjusted by means of a rear adjusting nut which can be set up to fix the parts as desired. Both the adjusting and the clamping nuts are operated by a spanner wrench.

The invention is illustrated in the accompanying drawings in which—

Figure 1 is a face view of the tool.
Fig. 2 is a side elevation.
Fig. 3 is a section on the line 3—3 of Fig. 1.
Fig. 4 is a face view of the head, and
Fig. 5 is a side view thereof.
Fig. 6 is a side view of the clamping ring.
Fig. 7 is a side view of the clamping nut.
Fig. 8 is a rear view of the clamping ring.

Referring specifically to the drawings, 6 indicates a hollow shank provided at the front end with a conical head 7 having inclined off-set grooves 8 to receive the cutters 9. The head has a threaded outwardly extending part or shoulder 10, behind which the shank is threaded as indicated at 11. 12 is a clamping ring having an internal conical recess to fit over the head 7, and grooves 13 to engage the outer edge of the cutters. These grooves are cut on a slant proper to the inclination of the blades, and the ring has an external shoulder 14 at its front end. This shoulder is engaged by the flange 15 of a clamping nut 16 which screws on the extended part 10 of the head, and serves to thereby draw in the clamping ring to grip the blades.

On the threads 11 of the shank, behind the head, is an adjusting nut 17 which bears against the rear ends of the cutters, by means of which the cutters can be advanced or set to desired position according to the size of the work. Both the clamping nut 16 and the adjusting nut 17 have holes 18 to receive a spanner wrench. Also, to hold the adjusting nut as set, a screw 19 is tapped into the same and bears against a piece of soft metal 20 which can be forced into the threads of the shank to hold the nut as set and also to sustain the thrust on the blades should the clamping nut become loose.

It will be seen that the cutters can be very easily adjusted by loosening the clamping nut and manipulating the adjusting nut, after which the clamping nut is screwed in to bind the clamping ring 12 tightly against the blades, and it is thus possible to adjust and set all the blades at a single operation.

What I claim as new is:

1. A hollow mill comprising a shank, a head having inclined grooves and an externally threaded shoulder behind the head, cutters in the grooves, a clamping ring extending around the cutters at the front end of the head, and a clamping nut screwed at its rear end on said shoulder and engaging said ring at its front end and adapted to draw said ring rearwardly against the cutters.

2. A hollow mill comprising a shank, a conical externally grooved head, cutters in the grooves, a clamping ring with a conical longitudinally grooved recess, fitting around the head, with the cutters engaged in the grooves, and a clamping nut screwed on the head and bearing against the ring to clamp the same on the cutters.

In testimony whereof, I do affix my signature in presence of two witnesses.

OTTO EBERT.

Witnesses:
JOHN A. BOMMHARDT,
G. W. ROSENBERG.